United States Patent
Erickson

(10) Patent No.: US 8,948,926 B2
(45) Date of Patent: Feb. 3, 2015

(54) SYSTEM FOR CONTROLLING VEHICLE PARAMETERS

(75) Inventor: Steven C. Erickson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 329 days.

(21) Appl. No.: 12/885,089

(22) Filed: Sep. 17, 2010

(65) Prior Publication Data

US 2011/0004384 A1    Jan. 6, 2011

Related U.S. Application Data

(63) Continuation of application No. 11/027,858, filed on Dec. 30, 2004, now Pat. No. 7,822,514.

(51) Int. Cl.
| | |
|---|---|
| *B60R 25/00* | (2013.01) |
| *G07C 9/00* | (2006.01) |
| *B60R 25/04* | (2013.01) |
| *B60R 25/24* | (2013.01) |

(52) U.S. Cl.
CPC ............ *B60R 25/00* (2013.01); *G07C 9/00007* (2013.01); *B60R 25/04* (2013.01); *B60R 25/241* (2013.01); *G07C 9/00111* (2013.01)
USPC . 701/2; 701/70; 701/79; 701/93; 340/426.13; 340/426.14; 340/426.15; 340/426.16; 340/426.17

(58) Field of Classification Search
CPC ........... G07C 9/00007; G07C 9/00015; G07C 9/00023; G07C 9/00111; G07C 9/00309; G07C 2009/00841; G07C 2009/00849; G07C 2009/00888
USPC ........ 701/1, 2, 70, 79, 93; 340/901, 904, 988, 340/989, 991–993, 425.5, 426.13–426.17, 340/426.35, 441
See application file for complete search history.

(56) References Cited

U.S. PATENT DOCUMENTS

| | | | |
|---|---|---|---|
| 4,754,255 | A | 6/1988 | Sanders et al. |
| 5,113,821 | A | 5/1992 | Fukui et al. |
| 5,200,900 | A | 4/1993 | Adrain et al. |
| 5,519,260 | A | 5/1996 | Washington |
| 5,532,690 | A | 7/1996 | Hertel |
| 5,769,051 | A | 6/1998 | Bayron et al. |
| 5,803,043 | A | 9/1998 | Bayron et al. |

(Continued)

FOREIGN PATENT DOCUMENTS

| | | | |
|---|---|---|---|
| JP | 07-306998 | 11/1995 | |
| JP | 9329233 A | * 12/1997 | .............. F16H 61/40 |

*Primary Examiner* — Jack W Keith
*Assistant Examiner* — Chuong P Nguyen
(74) *Attorney, Agent, or Firm* — Faegre Baker Daniels LLP

(57) ABSTRACT

A system is provided which is capable of controlling one or more parameters of a vehicle, such as vehicle speed or engine RPM. The system involves communication between a transmitter and a controller. The transmitter has memory containing information that corresponds to a vehicle parameter setting. The information is operatively transmitted from the transmitter to the controller. Once the controller receives the information, the vehicle parameter setting is identified by the controller. When the setting is identified, the controller may adjust at least one mechanism on the vehicle so as modify the vehicle parameter accordingly. One scenario in which the parameter modification is generally provided is if the controller determines that the vehicle parameter is exceeding the identified setting, which corresponds to the vehicle being operated at a level higher than that intended for the vehicle operator.

15 Claims, 5 Drawing Sheets

(56) References Cited

U.S. PATENT DOCUMENTS

| | | | |
|---|---|---|---|
| 5,913,910 A | 6/1999 | Ochi et al. | |
| 5,938,716 A | 8/1999 | Shutty et al. | |
| 5,969,633 A | 10/1999 | Rosler | |
| 5,995,898 A | 11/1999 | Tuttle | |
| 6,049,268 A * | 4/2000 | Flick | 340/425.5 |
| 6,112,152 A | 8/2000 | Tuttle | |
| 6,122,580 A | 9/2000 | Autermann | |
| 6,198,996 B1 * | 3/2001 | Berstis | 701/36 |
| 6,232,874 B1 | 5/2001 | Murphy | |
| 6,249,727 B1 * | 6/2001 | Muller | 701/36 |
| 6,253,143 B1 * | 6/2001 | Silvernagle et al. | 701/93 |
| 6,352,045 B1 | 3/2002 | Takashima | |
| 6,366,198 B1 | 4/2002 | Allen et al. | |
| 6,400,272 B1 | 6/2002 | Holtzman et al. | |
| 6,430,488 B1 * | 8/2002 | Goldman et al. | 701/36 |
| 6,572,015 B1 | 6/2003 | Norton | |
| 6,606,562 B1 | 8/2003 | Gifford | |
| 6,615,123 B2 * | 9/2003 | Morehouse | 701/49 |
| 6,624,744 B1 | 9/2003 | Wilson et al. | |
| 6,650,224 B1 | 11/2003 | Weigl | |
| 6,772,061 B1 | 8/2004 | Berthiaume et al. | |
| 6,891,467 B2 * | 5/2005 | Perttunen et al. | 340/426.17 |
| 7,042,346 B2 | 5/2006 | Paulsen | |
| 7,084,735 B2 | 8/2006 | Kapolka | |
| 7,227,283 B2 | 6/2007 | Suzuki | |
| 7,327,242 B2 * | 2/2008 | Holloway et al. | 340/439 |
| 8,534,397 B2 * | 9/2013 | Grajkowski et al. | 180/54.1 |
| 2002/0023062 A1 | 2/2002 | Kamihira | |
| 2002/0084887 A1 * | 7/2002 | Arshad et al. | 340/5.61 |
| 2003/0080875 A1 * | 5/2003 | Wathen | 340/825.72 |
| 2003/0189482 A1 | 10/2003 | Arshad et al. | |
| 2004/0005927 A1 * | 1/2004 | Bonilla et al. | 463/42 |
| 2004/0044454 A1 * | 3/2004 | Ross et al. | 701/33 |
| 2004/0212506 A1 | 10/2004 | Cherouny et al. | |
| 2004/0232772 A1 * | 11/2004 | Suzuki | 307/10.1 |
| 2004/0252027 A1 | 12/2004 | Torkkola et al. | |
| 2006/0129282 A1 | 6/2006 | Flick | |
| 2006/0129284 A1 | 6/2006 | Flick | |
| 2009/0182460 A1 * | 7/2009 | O'Neal et al. | 701/2 |
| 2011/0040447 A1 * | 2/2011 | Horiuchi | 701/41 |

* cited by examiner

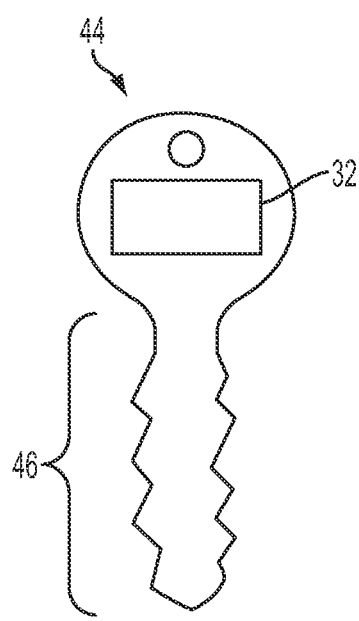
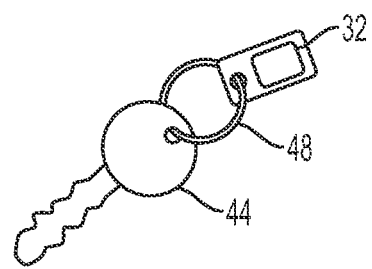
FIG. 3A
FIG. 3B

SYSTEM FOR CONTROLLING VEHICLE PARAMETERS

CROSS REFERENCE TO RELATED APPLICATION

This application is a continuation of U.S. patent application Ser. No. 11/027,858, filed Dec. 30, 2004 now U.S. Pat. No. 7,822,514, the disclosure of which is expressly incorporated herein by reference.

FIELD

Embodiments of the invention relate to vehicles and controlling parameters of such vehicles.

BACKGROUND SECTION

Recreational type vehicles such as all-terrain vehicles (ATVs), utility vehicles, motorcycles, golf carts, snowmobiles, and the like are generally operated by a wide range of people having varied levels of experience operating the vehicle. These people, or operators, tend to vary in a number of areas, including age, height, weight, and strength. These areas are cumulatively taken into account when determining how skilled a person may be in operating any one such vehicle. The skill level of the person is further influenced by the person's familiarity with the particular vehicle.

It is often desirable to be cautious when permitting a person to operate a vehicle, especially when that person is not familiar with the vehicle. If not cautious, the person could experience problems when operating the vehicle, which if serious, could potentially lead to circumstances not only affecting the condition of the vehicle, but also the safety of the operator. One example of exhibiting caution may involve having the person initially watch actual operation of the vehicle so that operating techniques can be learned through observation. Alternatively, one may ride with the person the first few times that the person operates the vehicle so that operating techniques can be learned through first-hand practice. Conversely, one may simply inform the person how the vehicle normally operates, and/or describe what should be done for safe and effective operation of the vehicle. In addition, the person may be informed what should be done if and when certain events occur (e.g., the engine stalls).

While all of the above approaches can increase the probability that a person's ride on the vehicle will be safe and uneventful, there is no guaranteeing this. As such, in certain instances, it may be desirable to limit the amount of freedom operators have with respect to operating vehicles, not only for the protection of the operator but also for the protection of the vehicle. In particular, in these instances, it may be desirable to eliminate any potential of deviating from parameters that are recommended with respect to operating such vehicles. If a vehicle could be configured to somehow limit the parameter automatically, it would be beneficial to the owner and the operator (if the operator is not the owner), as well as provide a valuable marketing tool for manufacturers of such vehicles. In addition, if this parameter limiting could be adjusted for a plurality of different operators, it would be of additional benefit. Further, if this parameter limiting could be provided for one or more of a number of different vehicle parameters, it would be advantageous.

BRIEF SUMMARY SECTION

Certain embodiments of the invention provide a system that is capable of controlling one or more parameters of a vehicle. The system involves communication between a transmitter and a controller. In certain embodiments, the transmitter is transportable, while the controller is located on the vehicle. The transmitter has memory containing information. In certain embodiments, the information corresponds to one setting for a vehicle parameter; however, it is to be appreciated that the information may alternatively correspond to a plurality of settings, with each setting corresponding to a different vehicle parameter. When the transmitter is brought within a close distance of the controller, the information is operatively transmitted to the controller. Once the controller receives the information, the vehicle parameter setting corresponding to the information is identified by the controller. In certain embodiments, this identification is provided by comparing the transmitted information to a set of information stored in memory of the controller. When the vehicle parameter setting is identified, in certain embodiments, the controller adjusts at least one mechanism on the vehicle to correspond with such parameter setting. This may involve removing a restriction or limit on the vehicle parameter, or conversely, may involve adjusting the at least one mechanism on the vehicle so as to impose a restriction or limit on the vehicle parameter. In this latter case, the parameter restriction is generally provided if the controller determines that the vehicle parameter setting is being exceeded, which corresponds to the vehicle being operated at a level which is higher than the skill level of the operator. In certain embodiments, the controller is operatively coupled to a sensor that monitors the vehicle parameter and enables the controller to make the above determination.

Certain embodiments of the invention provide a vehicular system for controlling a vehicle parameter. The vehicular system comprises a controller, a transmitter, a sensor, and at least one mechanism. The controller is located on the vehicle and has memory. The memory stores a plurality of code sequences, with each code sequence corresponding to a different setting for a vehicle parameter. The transmitter includes an integrated chip having preprogrammed memory storing a code sequence. The code sequence corresponds to one setting for the vehicle parameter. The transmitter is adapted for communication with the controller, with the communication involving transmission of a signal from the transmitter to the controller. The signal contains the code sequence, and the controller is adapted to identify the one setting for the vehicle parameter corresponding to the code sequence. The sensor is electrically coupled to the controller, and is adapted for measuring the parameter of the vehicle. The at least one mechanism is located on the vehicle and is adapted for adjustment so as to control the vehicle parameter. The at least one mechanism is electrically coupled to the controller. The controller is adapted to adjust the at least one mechanism so as to modify the vehicle parameter if the vehicle parameter measured by the sensor exceeds the one setting corresponding to the code sequence identified by the controller.

Also, certain embodiments of the invention provide a system for modifying operability of a vehicle. The system comprises a controller, a transmitter, and at least one mechanism. The controller is located on the vehicle and has memory for storing a plurality of code sequences, where each code sequence corresponds to a different skill level for the operator. The transmitter includes an integrated chip having preprogrammed memory storing a code sequence. The code sequence corresponds to one skill level for an operator operating the vehicle. The transmitter is adapted for communicating with the controller, where the communication involves transmission of a signal from the transmitter to the controller.

The signal contains the code sequence, and the controller is adapted to identify the one skill level for the operator corresponding to the code sequence. The at least one mechanism is located on the vehicle and is adapted for adjustment based on the one skill level identified. The at least one mechanism is electrically coupled to the controller, and the controller is adapted to adjust the at least one mechanism so as to modify operability of the vehicle based on the one skill level identified.

BRIEF DESCRIPTION OF THE DRAWINGS

FIG. 3A is a perspective view of a transmitter in accordance with one embodiment of the invention;

FIG. 3B is a perspective view of a transmitter in accordance with another embodiment of the invention;

DETAILED DESCRIPTION SECTION

Figure 1:
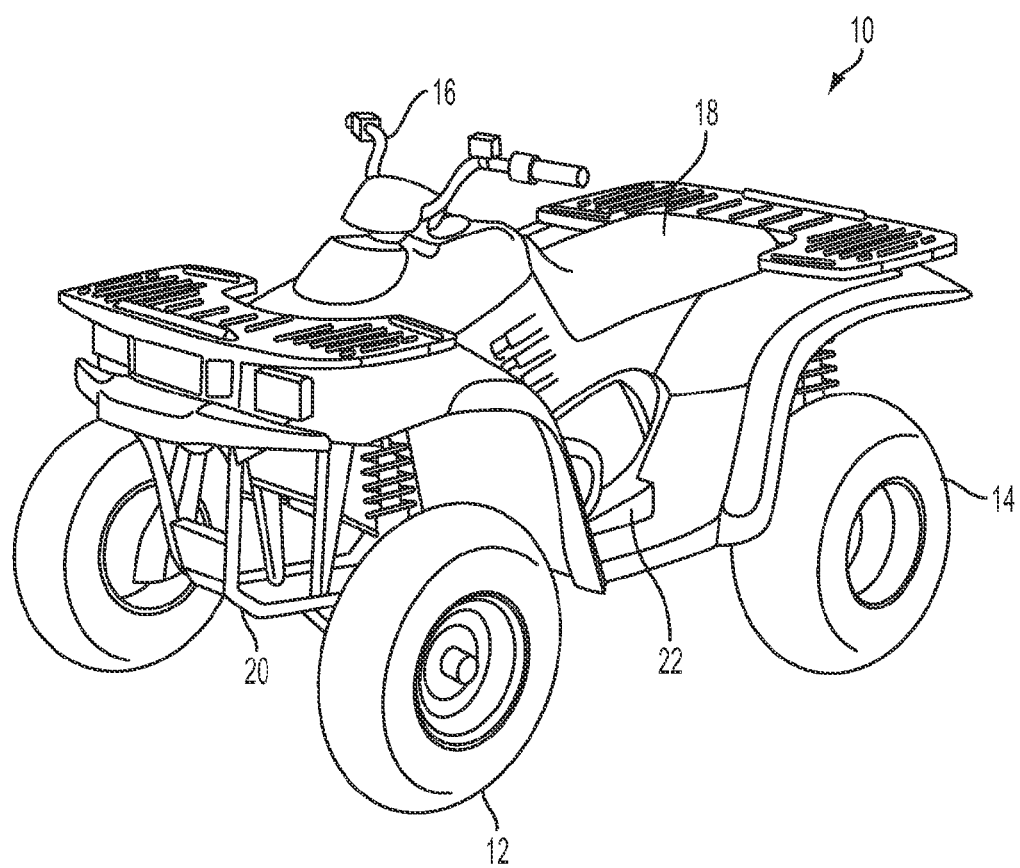
FIG. 1 is a perspective view of an ATV constructed in accordance with one embodiment of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention.

An ATV 10 having a system in accordance with one embodiment of the invention is illustrated in FIG. 1. The ATV includes a chassis, designated generally by reference numeral 20, to which the various systems and components of the vehicle are attached. These components include front wheels 12, rear wheels 14, handlebars 16 connected by a suitable steering linkage to the front wheels 12 for steering the vehicle, and a straddle-type seat 18 upon which the rider sits. An engine and continuously variable transmission (CVT) are carried on the chassis 20, generally beneath the straddle-type seat 18 and substantially between a pair of footrests (only a left footrest 22 is visible in FIG. 1). The invention is designed for use on vehicles such as the ATV of FIG. 1, however, it may be used on other vehicles such as utility vehicles, golf carts, motorcycles, snowmobiles and the like.

Figure 2:
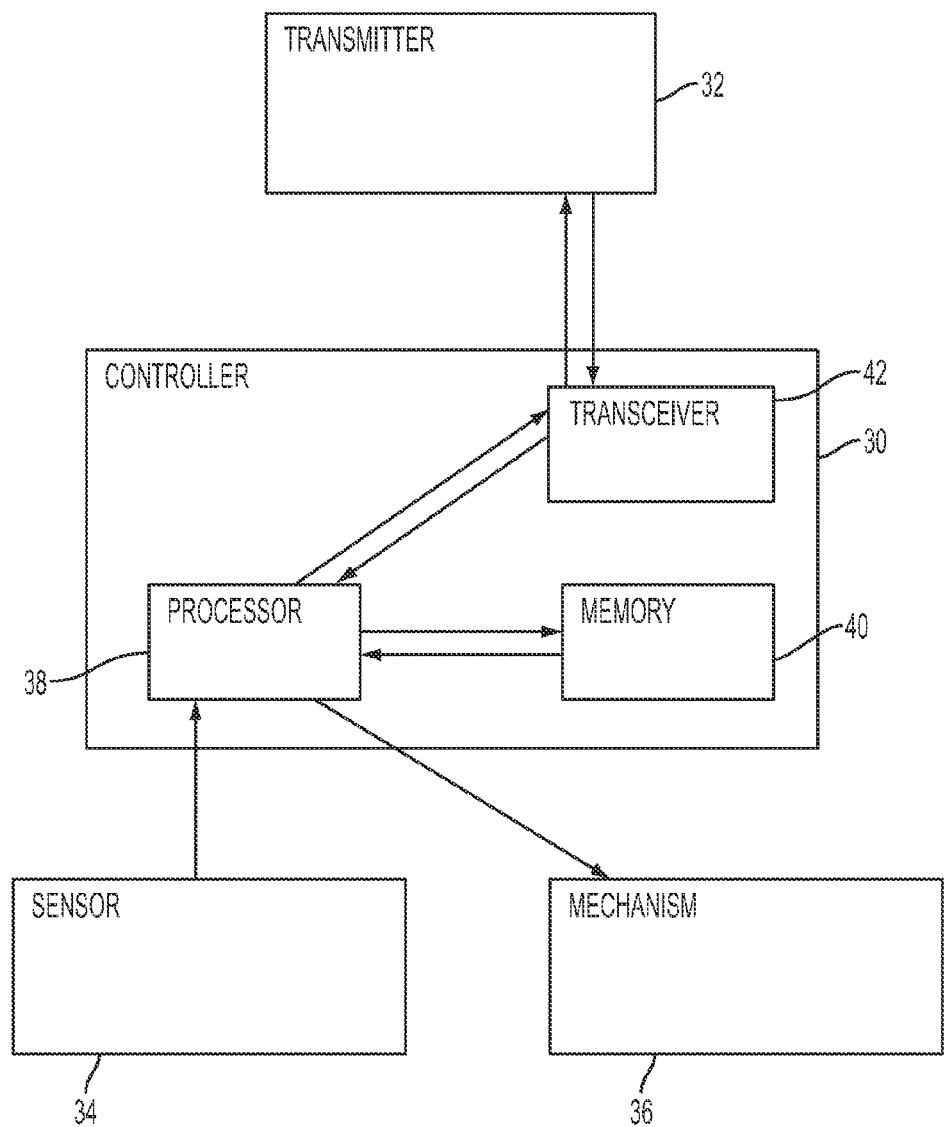
FIG. 2 is a block diagram showing the system schematic of one embodiment of the invention.

The system described herein is capable of controlling one or more parameters of a vehicle. A block diagram depicting an exemplary embodiment of the system of the invention is shown in FIG. 2. Components of the system include a controller 30, a transmitter 32 or transceiver, and at least one mechanism 36. As shown, in certain embodiments, the system also includes a sensor 34. In certain embodiments, the controller 30 includes a processor 38 with memory 40 and a transceiver 42. The transceiver 42 is shown as a part of the controller 30 for convenience; however, the invention should not be limited as such. It should be appreciated that the transceiver 42 could be separately located from the controller 30 and still function as intended with respect to the invention as long as the transceiver 42 is located within transmitting distance of the controller 30. The arrows connecting the system components are shown to illustrate the direction of outgoing signals from each component. In certain embodiments, the transmitter 32 is a transponder (e.g., whereby receipt of a query signal is required before a response signal is transmitted). As such, the controller 30 sends signals to the transmitter 32 and the at least one mechanism 36. The controller 30 receives signals from the transmitter 32 and, if included, the sensor 34. With respect to the functioning of components of the controller 30, when the transmitter 32 is brought within transmitting range of the transceiver 42, the transceiver 42 transmits signals from the processor 38 to the transmitter 32 and sends signals received from the transmitter 32 to the processor 38. Accordingly, the processor 38 sends signals to the at least one mechanism 36. In certain embodiments, these signals sent to the at least one mechanism 36 further depend on signals being received by the processor 38 from the sensor 34. The memory 40, while represented as separate from the processor 38, may be generally integral with the processor 38. The memory 40 is represented in FIG. 2 as being separate from the processor 38 to demonstrate that it both receives signals from and sends signals to the processor 38. Of course, other components are connected to the controller 30 to aid in its function, as is well known in the art. The components shown in FIG. 2 are merely those relevant to this exemplary embodiment. Suitable equivalents to the components described may be substituted as well.

In certain embodiments, the system of the invention is designed as an "add-on" device to a vehicle. Thus, the controller 30 as well as other necessary components of the system are designed with the assumption that such components would not be normally included in the standard design of a vehicle and, as such, would need to be bought as a kit for such vehicle. To be compatible to the vehicle, the controller 30 would need to either be compatible with existing wiring harnesses of the vehicle, or a new wiring harness for power supply would also need to be provided in such kit. Such a controller 30 is available from Sure Power Industries, Inc.

Certain embodiments of the system of the invention can be designed to function with the vehicle in any of a variety of different fashions. For example, the system can be designed to initially control the vehicle at an initial setting of vehicle parameter. As such, the system enables the vehicle to be operated up to a certain level, e.g., up to this initial setting. In turn, when the transmitter 32 is brought within transmitting range of the transceiver 42, the system facilitates the transfer of information from the transmitter 32 to the controller 30. Subsequently, the system may modify how the vehicle can be operated based on this transferred information. In certain embodiments, the transmitter 32 is an IC chip having memory and the information programmed or stored therein is in the form of a code sequence. Such transmitters are commonly known as RFID tag. The code sequence acquired by the controller 30 during such transfer indirectly corresponds to the skill level of the person with respect to operating the vehicle. Specifically, in certain embodiments, the code sequence corresponds to a specific setting for one or more parameters of the vehicle, whereby the specific setting(s) correspond to the operator's skill level for operation of the vehicle.

In certain embodiments, the system is designed to control vehicle speed. With respect to this vehicle parameter, one or more skill levels (e.g., "Beginner", "Intermediate", "Expert", etc.) are designated for different operators of the vehicle. For every designated skill level, a specific setting of the vehicle parameter is correspondingly assigned. For example, for an "Expert" skill level, the specific setting for the vehicle parameter, e.g., vehicle speed, is assigned, e.g., for forty-five miles per hour. In turn, a code sequence corresponding to each assigned specific setting is stored in the memory 40 of the controller 30. In addition, one of the code sequences corresponding to the specific settings of the vehicle parameter is stored in the memory of the transmitter 32.

In certain embodiments, the vehicle is designed to be initially operated at an initial specific setting corresponding to one of the code sequences stored in the memory 40 of the controller 30. Subsequently, the initial specific setting may be altered only if the operator brings the transmitter 32 within transmitting range of the transceiver 42. For example, the vehicle may be initially designed to operate at a "Beginner" skill level, in which the vehicle will only be permitted to operate, e.g., at speeds, up to a certain level, e.g., twenty-five miles per hour, corresponding to the "Beginner" skill level. Subsequently, the vehicle may only be changed from such initial specific setting, and corresponding code sequence and skill level, by an operator bringing the transmitter 32 with stored code sequence within transmitting range of the transceiver. As such, when the transmitter 32 is brought within such transmitting range, the code sequence stored on the transmitter 32 is transmitted to the controller and identified. In turn, operability of the vehicle can be modified according to the transmitted code sequence if different from the initial code sequence of the vehicle. In summary, the transmitter 32 would be used to transfer the code sequence to the controller 30 on the vehicle, and the controller 30 would associate such code sequence with the corresponding specific setting and control the vehicle accordingly.

Generally, as described herein, the code sequence stored in the transmitter 32 indirectly corresponds to the operator skill level. However, it should be appreciated that other embodiments of the invention can exist in which the code sequence stored in the transmitter 32 directly represents the operator skill level. As such, for example, instead of the code sequence corresponding to a specific setting for a parameter of the vehicle, the code sequence can correspond to an operator skill level (e.g., "Expert"). As such, the code sequence may be stored in memory of the transmitter 32, and the controller 30 would be configured to associate such code sequence with the corresponding operator skill level, and in turn, select a corresponding specific setting (e.g., twenty-five miles per hour) for one or more vehicle parameters (e.g., vehicle speed) based on the skill level of the operator. Thus, by describing an exemplary embodiment herein whereby the code sequence corresponds to a specific setting for one or more vehicle parameters, it is not done with the intention of limiting the invention to such.

In certain embodiments, the transmitter 32 is transportable, while the controller 30 is located on a vehicle. In turn, when a person is allowed to operate the vehicle, the transmitter 32 is generally provided to him. In certain embodiments, as shown in FIG. 3A, the transmitter 32 is operatively coupled to an ignition key 44 for the vehicle. As such, the person would have the transmitter 32 whenever he or she is operating the vehicle. Thus, the transmitter 32 would be within transmitting range of the transceiver 42 when the vehicle is being operated since the ignition key 44 is placed proximate to the vehicle (in a ignition key slot) when operating the vehicle. The transmitter 32 may be positioned on the key 46 in a plurality of different locations; however, it would generally be desirable to position the transmitter 32 so as to not interfere with the functioning of the ignition key 44. As such, the transmitter 32 would likely be positioned outside the cut area 46 of the key 44; however, the invention should not be limited to such. Alternatively, one could have the transmitter 32 located separate from the key 44 as shown in FIG. 3B. In such embodiments, the transmitter 32 can be part of a key ring or separately coupled to such a key ring 48 for the ignition key 44 (as shown). However, it should be appreciated that in such embodiments where the transmitter 32 is located separate from the key 44, the transmitter 32 may be removed by the operator so as to not function as intended with the vehicle when the vehicle is operated. To decrease the potential of this occurring, embodiments involving the transmitter 32 being operatively coupled to the key 44 are more preferable.

In certain embodiments, each transmitter 32 will have its own outwardly identifying attribute. In turn, the attribute will help a person identify the specific setting for the vehicle parameter corresponding to the code sequence stored on the transmitter 32. As such, the transmitter 32, based on the attribute, can be outwardly identified without having to use it initially with a corresponding vehicle. In certain embodiments, the identifying attribute is with respect to color. For example, a transmitter storing a code sequence corresponding to a parameter setting for "Beginner" skill level may be red, while a transmitter storing a code sequence corresponding to a parameter setting for "Expert" skill level may be green.

As mentioned herein, the code sequence transferred from the transmitter 32 to the controller 30 is generally programmed in the memory of the transmitter 32, and such code sequence corresponds with a vehicle parameter setting. In certain embodiments, such code sequence corresponds with a plurality of settings, with each setting corresponding to a different vehicle parameter. As such, each code sequence does not itself contain a specific setting for a vehicle parameter. Instead, each such code sequence corresponds to a specific setting for a vehicle parameter only after the code sequences have been previously assigned to such specific settings and subsequently programmed into the controller 30. As such, the specific settings assigned and programmed into the controller 30 can subsequently be varied as desired.

The code sequences can include any combination of characters (e.g., an alpha/numeric combination) that can be identified by the controller 30. In certain embodiments, the code sequence is identified by the controller 30 via the processor 38 by comparing the code sequence to a set of code sequences stored in the memory 40 of the controller. Each code sequence, in certain embodiments, may also include a distinguishing portion. The purpose of including such a distinguishing portion (e.g., an alpha/numeric combination) would be for the controller 30 to distinguish between two or more transmitters 32 having the same parameter settings programmed therein. In turn, each controller 30 can be configured to only work with transmitters 32 manufactured for the vehicle that the controller 30 is located on.

In accordance with certain embodiments of the invention, each transmitter 32 can be a Radio Frequency Identification (RFID) tag. RFID has become an important identification technology in applications such as inventory management, security access, personnel identification, factory automation, automotive toll debiting, and vehicle identification. In general, an RFID system includes an RFID transmitter-receiver unit and an RFID tag. With respect to the invention, the controller 30 and transceiver 42 in combination are the transmitter-receiver unit. In use, the RFID transmitter-receiver is used to query the RFID tag, which may be located a distance from the transmitter-receiver unit. Upon detection of the interrogating or query signal, the RFID tag transmits a response signal back to the receiver. With respect to the invention, the response signal contains the code sequence. In certain embodiments, such code sequence corresponds to specific settings for the one or more vehicle parameters. In certain embodiments, the code sequence may be further encoded or encrypted. As a result, a decrypter or a corresponding database may be needed further for deciphering the code sequence in order to then associate the code sequence with the corresponding specific setting.

RFID systems provide identification functions not found in other identification technologies such as optical indicia (e.g., bar code) recognition systems. For example, RFID systems may employ RFID tags containing read/write memory of several kilobytes or more. As such, the code sequence stored on the transmitter 32 can be modified whenever warranted and there is adequate memory space to have the code sequence correspond to a specific setting for a vehicle parameter or, if desired, to have the code sequence correspond to specific settings for a plurality of vehicle parameters. The RFID tags may be readable at a distance and do not require direct line-of-sight view by a reading apparatus (e.g., base station or interrogator). In turn, the transmitters 32 can be placed a distance away from the controller 30 and still transmit the code sequence stored therein. Further, several such RFID tags may be read by the RFID system at one time. As such, in certain embodiments, one or more transmitters 32 can be given to an operator, whereby each transmitter 32 would store its own code sequence corresponding to a specific setting for a different parameter for the vehicle, and whereby each code sequence from each transmitter 32 could be transmitted at one time.

RFID tags may be entirely passive (i.e., having no power supply), which allows for availability in a small and portable package. However, this identification system would be only capable of operation over a relatively short range, limited by the size of an electromagnetic field used to supply power to the tags and to communicate with the tags. Such electromagnetic field typically is generated by an antenna. Such antennas are generally integrated with the transmitter-receiver; however, they can just as well be mounted a transmittable distance from the transmitter-receiver. Alternatively, RFID tags may utilize a larger active transmitter device affixed to an object to be monitored which receives a signal from the interrogator. The device receives the signal, then generates and transmits a responsive signal. The interrogation signal and the responsive signal are typically radio-frequency (RF) signals produced by an RF transmitter circuit. Because active devices have their own power sources, they do not need to be in close proximity to an interrogator or reader to receive power via electromagnetic waves.

Figure 4:
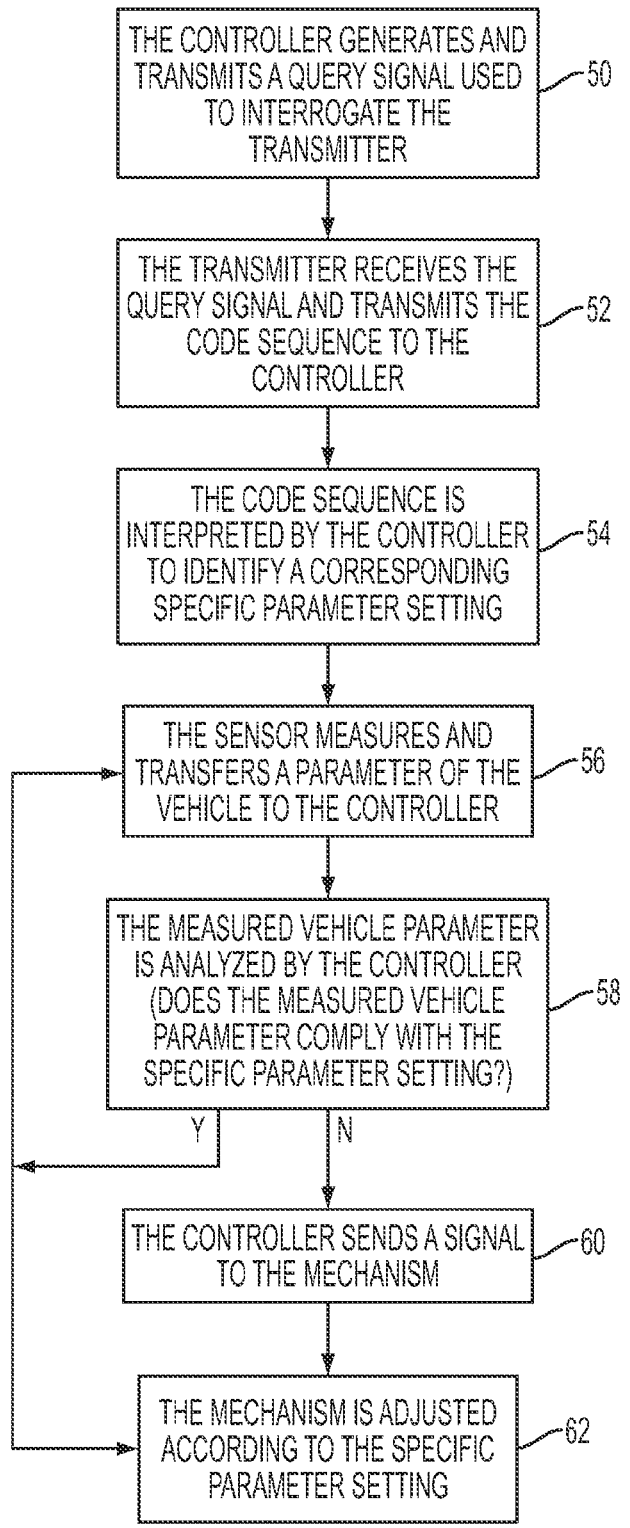
FIG. 4 is a flowchart describing operation of the system in accordance with one embodiment of the invention.

FIG. 4 illustrates a flow chart showing an embodiment of the operation of the invention. It should be appreciated that FIG. 4 illustrates only one exemplary embodiment, and steps in the flow chart could be exchanged or even in some cases eliminated without diverting from the spirit of the invention. As described above, FIG. 2 illustrates a block diagram of the invention in accordance with the flowchart, depicting each of the system components mentioned with respect to the flowchart of FIG. 4. Based on the functions described below for each of the components within the flowchart, it is contemplated that those skilled in the art would find it obvious to be able to select appropriate devices and corresponding manufacturers for each component.

As depicted in FIG. 4, the vehicle parameter controlling function of the system is initiated through communication between the transmitter 32 and the controller 30. As mentioned above, in certain embodiments, the communication can be facilitated via RFID technology. As such, steps of the flowchart depicted in FIG. 4 are described in reference to such RFID technology. However, it should be appreciated that other modes of communication, direct or indirect (wireless) could be utilized instead of or in combination with RFID. As such, by describing an embodiment for the use of RFID technology, it is not done with the intention of limiting the invention to such.

In using RFID for such communication, bringing the transmitter 32 within a certain distance of the controller 30 facilitates a signal being sent from the transmitter 32 to the controller 30. As described above, the transmitter 32 could be passive, in which case it would need external influence (e.g., an electromagnetic field) to operate (e.g., transmit signals), or the transmitter 32 could be active, in which case it would have a power source and need only be within transmitting range to operate. If the transmitter 32 functions as a transponder, an initial step 50 of the process would involve the controller 30 generating and transmitting a query signal used to interrogate the transmitter 32. In order to facilitate this interrogation, the processor 38 would send the query signal to the transceiver 42 that is in communication with the processor 38. Subsequently, the transceiver 42 would wirelessly transmit the query signal to the transmitter 32, preferably by radio waves.

Step 52 involves the transmitted query signal being received by the transmitter 32. In accordance with certain embodiments of the invention, the transmitter 32 is adapted to wirelessly receive the query signal and also adapted to wirelessly transmit the code sequence upon its receipt of the query signal. As such, in response to the query signal being received, the transmitter 32, also in step 52, transmits a code sequence stored therein to the controller 30 via the transceiver 42, preferably by radio waves. The transceiver 42 would be adapted to distinguish, differentiate, or filter signals other than what they are intended to receive. As mentioned herein, the transceiver 42 is in communication with the processor 38. As such, the code sequence transmitted from the transmitter 32 to the transceiver 42 is subsequently transferred to the processor 38.

In certain embodiments of the invention, there may be multiple transceivers 42. For example, if more than one transmitter 32 is queried, the controller 30 may have more than one transceiver 42 to receive signals from the different transmitters 32, which signals would then be sent to the processor 38 from the transceivers 42. This would be the case for embodiments where a plurality of code sequences corresponding to specific settings for more than one vehicle parameter are each stored on separate transmitters 32 instead of being all stored on one transmitter 32 as one code sequence. As such, the settings would be transmitted from the corresponding transmitters 32, and via the transceivers 42, subsequently transferred to the controller 30 in response to the query signal. This technique of receiving code sequences with corresponding transceivers 42 could be accomplished by selecting appropriate receiving ranges for each of the transceivers 42. Preferably, each of the transceivers 42 would also be adapted to distinguish, differentiate, or filter signals other than what they are intended to receive. Alternatively, if one wanted to limit the number of transmitters 32 used, a single transmitter 32 storing a code sequence can be given to the operator, whereby the stored code sequence would correspond to specific settings for a plurality of vehicle parameters. In such case, one transceiver 42 would be used to receive and transmit the code sequence. Again, the transceiver 42 would preferably be adapted to distinguish, differentiate, or filter signals other than what it is intended to receive.

In step 54, the code sequence is interpreted by the controller 30 via the processor 38. If necessary, the controller 30 via the processor 38 is adapted to segregate the information transmitted from the transmitter 32 (e.g., if the code sequence contains one or more code sequences each corresponding to a specific setting for a different vehicle parameter). In certain embodiments, the code sequence is also logged, e.g., stored in the memory 40. The code sequence is interpreted using software and/or a database of identifying information. It is to be appreciated that such software can generally be incorporated in the processor 38. Using the software, the code sequence would be cross-referenced with the information in the database, preferably held in the memory 40. In turn, the specific setting for the one or more parameters would be identified which corresponds to the code sequence. In certain embodiments, based on the interpretation, messages or indications could be communicated to the user via output elements (e.g., displays, annunciators, speakers, etc. on the vehicle) so that the operator would not mistake that the vehicle, when controlled per the parameter, was not working correctly. For example, the user could be notified via the output elements that the vehicle speed (parameter) will be set for a maximum speed (specific setting) of thirty-five miles per hour. Such communication with the user could be facilitated by the processor 38 being coupled to a control panel operatively connected to the output elements of the vehicle.

Additionally represented in the block diagram of FIG. 2 is a sensor 34, which is located on the vehicle. The sensor 34 is adapted to measure at least one parameter of the vehicle 100, referenced as step 56. In certain embodiments, the parameter measured is vehicle speed; however, it should be appreciated that many other parameters may be measured, for example, engine RPM, engine temperature, etc. In addition, the sensor 34 may reference one or more sensors each measuring a different parameter of the vehicle if the system is being used to control more than one vehicle parameter. With respect to the vehicle parameter being vehicle speed on an ATV for example, the sensor 34 could be a wheel speed sensor that monitors vehicle speed through wheel revolutions per unit time (e.g., minute or second). Further, in step 56, the measured vehicle parameter is subsequently transferred to the controller 30. The sensor 34 would be operatively coupled to the controller 30 via the processor 38. Sensor 34 need not be dedicated to controller 30. That is, sensor 34 could be a preexisting RPM sensor or vehicle speed sensor that supplies sensed vehicle data to a speedometer. In such embodiments, speed data from the preexisting sensor could be routed to the processor 38 via a connection to the vehicle speedometer.

In step 58, the measured vehicle parameter is, in turn, analyzed by the controller 30 via the processor 38. The processor 38 determines whether the measured vehicle parameter complies with the specific setting for the vehicle (identified by the controller 30 via the processor 38 and memory 40 in step 54). For example, if the measured vehicle parameter exceeds the specific setting for the vehicle parameter, the controller 30 via the processor 38 would send a signal to the at least one mechanism 36 in step 60. If the system were being used to control more than one vehicle parameter, the controller 30 via the processor may accordingly send a signal to more than one mechanism in step 60 to modify the corresponding vehicle parameters. In certain embodiments, the at least one mechanism 36 is integral to the vehicle and can be modified to control the vehicle parameter. In step 62, the at least one mechanism 36 is manipulated to control the vehicle parameter accordingly. With respect to the vehicle parameter being vehicle speed on an ATV for example, the at least one mechanism 36 can be an electromechanical solenoid vacuum valve that is connected to the carburetor's diaphragm/slide mechanism. One type of such a system is disclosed in U.S. Pat. No. 3,596,642, entitled "Control System For Limiting Overload And Overrunning Of An Internal Combustion Engine" and hereby incorporated by reference herein. By adjusting the valve accordingly, the RPM of the engine, and, therefore the vehicle speed can be controlled to operate within certain desired levels. Many other types of well-known speed limiter systems, RPM limiter systems, etc. may be used as the adjustable mechanism controlled by the controller. For instance, the RPM or speed limit mechanisms may be spark inhibitors available in the vehicle's existing engine control module or capacitive discharge ignition system.

In certain embodiments, the adjustment to the at least one mechanism 36 would be provided in a repeating fashion as shown in FIG. 4. For example, assume that the vehicle parameter is the vehicle speed on a carbureted ATV and that the adjustable mechanism is the solenoid vacuum valve described above. When the vehicle is accelerated, the at least one mechanism 36 may need to be readjusted to limit the engine RPM. After the measured vehicle parameter is found to comply in step 58 or after the at least one mechanism 36 is adjusted in step 62, the flowchart loops back to step 56, where the vehicle parameter is again measured by the sensor 34. Subsequently, if the vehicle parameter were determined to be below or above the specific setting, the at least one mechanism 36 could be adjusted accordingly so that the vehicle is limited to a certain degree within the specific setting for the vehicle parameter.

Figure 5:
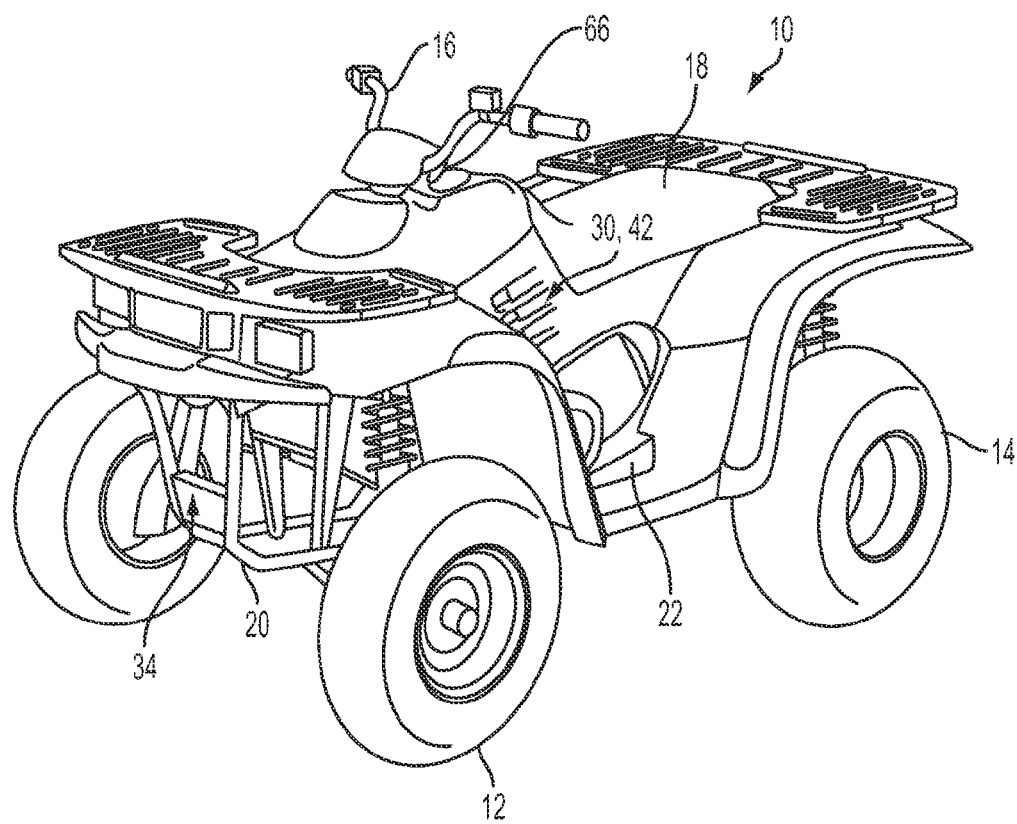
FIG. 5 is a perspective view of the ATV of FIG. 1 implementing the system of the invention in accordance with one embodiment of the invention.

FIG. 5 shows an exemplary embodiment of the invention, from which the general proximity of the system components of FIG. 2 are described with respect to the ATV 10 of FIG. 1. In certain embodiments as described herein, the transmitter 32 is integrated to the ignition key (or coupled to the ignition key as or by a key ring) of the ATV 10. As such, when operating the vehicle, the transmitter 32 would be on or proximate to the ignition key (not shown) placed in the ignition slot 66, which is generally located between the handlebars 16. As mentioned herein, the controller 30 communicates with the transmitter 32 via a transceiver 42. As described, the transceiver 42 can be mechanically coupled to the controller 42, but the invention should not be limited as such. In certain embodiments, the controller 30 and transceiver 42 are energized by the same power source, thus making it desirable to have both the controller 30 and the transceiver 42 located in close proximity to each other. If the controller 30 and transceiver 42 are provided as a kit for the ATV 10, their location on the ATV 10 will generally be dictated by where the wiring harnesses for powering the ATV 10 are located. In certain embodiments, this location for the controller 30 and transceiver 42 would generally be proximate to the engine of the ATV 10 (not visibly shown but located generally beneath the seat 18 and substantially between the pair of footrests; only the left footrest 22 is shown). However, if not provided as a kit, the controller 30 and transceiver 42 can be located on the vehicle as desired so long as they are within transmittable range of each other and the transceiver 42 is within transmittable range of the transmitter 32 when the vehicle is being operated. The sensor 34 is located proximate to the vehicle mechanism that it is sensing. For example, with respect to vehicle speed, the sensor 34 is located proximate to an axle of either the front wheels 12 or rear wheels 14. The at least one mechanism 36 is located proximate to the vehicle mechanism that is adjusted for controlling the vehicle parameter. For example, with respect to vehicle speed, the at least one mechanism 36 is located proximate to the engine (location previously described), e.g., at the solenoid vacuum valve connected to the carburetor's diaphragm/slide mechanism (not visibly shown).

While exemplary embodiments have been described, it should be understood that various changes, adaptations, and modifications may be made therein without departing from the spirit of the invention and the scope of the appended claims.

The invention claimed is:

1. A system for modifying operability of a vehicle by controlling a vehicle parameter, comprising:
   a controller located on a vehicle, the controller having a memory, the memory configured for storing at least a first code sequence, a second code sequence, and a third code sequence, each of the first, second, and third code sequences corresponding to a different skill level for a vehicle operator, the first code sequence corresponding to a beginner skill level and allowing for operation of the vehicle up to a first speed greater than zero, the second code sequence corresponding to an intermediate skill level and allowing for operation of the vehicle up to a second speed greater than the first speed, and the third code sequence corresponding to an expert skill level and allowing for operation of the vehicle at a speed greater than the second speed, and the controller is configured to initially set the vehicle parameter to an initial code sequence corresponding with the first code sequence during an initial operation of the vehicle;
   a transmitter including an integrated chip having preprogrammed memory configured for storing a code sequence, the stored code sequence corresponding to one skill level for the vehicle operator, the transmitter configured for communication with the controller, the communication involving transmission of a signal from the transmitter to the controller, the signal containing the stored code sequence, the controller adapted to identify the one skill level for the operator corresponding to the stored code sequence;
   at least one mechanism located on the vehicle, the at least one mechanism configured for adjustment based on the one skill level identified, the at least one mechanism electrically coupled to the controller, the controller being configured to adjust the at least one mechanism so as to modify operability of the vehicle based on the one skill level identified, the controller being configured to initially adjust the at least one mechanism according to one of the first, second, and third code sequences; and
   a vehicle sensor configured to measure a vehicle parameter, wherein the operability modification of the vehicle is based on the identification of the one skill level in combination with a reading from the vehicle sensor, and the controller is configured to adjust the at least one mechanism so as to modify the vehicle parameter if the vehicle parameter measured by the sensor exceeds a predefined vehicle parameter corresponding to the one skill level identified by the controller.

2. The system of claim 1, wherein the communication between the transmitter and the controller is configured to occur only when the transmitter is within a certain distance from the controller.

3. The system of claim 1, wherein the transmitter is a RFID tag.

4. The system of claim 1, wherein the transmitter is coupled to an ignition key for the vehicle.

5. The system of claim 1, further comprising a transceiver located on the vehicle within transmitting range of the controller, and whereby the communication between the transmitter and the controller is configured to occur via the transceiver.

6. The system of claim 1, wherein the controller includes software configured to compare the one code sequence with the plurality of code sequences stored in the memory of the controller so as to identify the one skill level for the operator.

7. The system of claim 1, wherein the one skill level corresponds to one vehicle setting for a certain vehicle parameter.

8. The system of claim 1, wherein the at least one mechanism is configured for adjustment so as to modify a vehicle parameter.

9. The system of claim 1, wherein the vehicle parameter is vehicle speed.

10. The system of claim 1, wherein the vehicle is an all-terrain vehicle.

11. The system of claim 1, wherein the transmitter has an attribute that outwardly identifies one setting for the predefined vehicle parameter corresponding to the code sequence stored on the transmitter.

12. The system of claim 1, wherein the controller is configured to alter the initial code sequence only if the transmitter communicates with the controller.

13. A system for controlling a parameter of a vehicle, comprising:
   means for initially setting the vehicle parameter to an initial code sequence during an initial operation of the vehicle;
   means for transmitting a code sequence query signal from the vehicle;
   means for receiving the query signal by a transportable transmitter, the transmitter transmitting a preprogrammed code sequence signal to a controller in response to the query signal, the code sequence signal containing a code sequence corresponding to one setting for the vehicle parameter;
   means for receiving the transmitted code sequence signal;
   means for identifying the one setting for the vehicle parameter corresponding to the code sequence from the received code sequence signal;
   means for altering the initial code sequence when the code sequence signal differs from the initial code sequence;
   means for sensing the current value of the vehicle parameter on the vehicle; and
   means for adjusting a mechanism on the vehicle in order to modify the current value of the vehicle parameter if the current value of the vehicle parameter measured by the sensing means exceeds the one setting corresponding to the code sequence.

14. The system of claim 13, wherein the initial code sequence corresponds with a beginner skill level.

15. The system of claim 13, further comprising means for altering the initial code sequence only if the transmitter communicates with the controller.

* * * * *